Patented Jan. 27, 1948

2,435,017

UNITED STATES PATENT OFFICE 2,435,017

PROCESS FOR THE MANUFACTURE OF SATURATED AND UNSATURATED COMPOUNDS OF THE ETIO-CHOLANIC ACID SERIES AND SUBSTITUTION PRODUCTS THEREOF

Tadeus Reichstein, Basel, Switzerland, assignor to Ciba Pharmaceutical Products, Inc., Summit, N. J., a corporation of New Jersey No Drawing. Application December 28, 1945, Serial No. 637,778. In Switzerland November 9, 1937

5 Claims. (Cl. 260—397.1)

By suitable oxidation of steroids having a side chain in 17-position, if required after intermediate protection of nuclear double linkages and nuclear hydroxyl groups, mixtures are obtained which contain neutral and acid constituents. The acid constituents may be isolated from the said mixtures by means of alkaline reagents, for example by extraction of an ethereal solution of the mixture with caustic soda or potash and liberation of the acids from the alkaline layer by means of inorganic acids. The acid constituents may also be removed, e. g. by filtering a solution of the said mixture in an organic solvent like ethylacetate, gasoline, etc., through an aluminium oxide column and eluting the acids by means of watery buffer solutions. Hitherto only the neutral constituents have found practical application. In individual cases uniform products containing the unchanged cyclopentanopolyhydrophenanthrene ring system have also been separated from the acid constituents also produced by the oxidation (L. Ruzicka and A. Wettstein, Helv. Chim. Acta, vol. 18, pages 992–993 [1935]; Dalmer and coworkers, Berichte, vol. 68, page 1814 [1935]). Depending on the parent material used these products are acids of the cholanic acid or norcholanic acid series and are therefore compounds containing at least 4 carbon atoms in the side chain. These acids are of no practical importance. It has not hitherto been possible to obtain from such oxidation mixtures compounds of the etio-cholanic acid series.

According to this invention saturated and unsaturated compounds of the etio-cholanic acid series or their substitution products can be made and isolated from the aforesaid acid oxidation products by subjecting them to a fractionation treatment.

For example, starting from cholesterol (I) there are obtained 3-hydroxy-etio-cholenic acid (II) and 3-hydroxy-bis-nor-cholenic acid (III). In addition there can be obtained as is already known 3-hydroxy-cholenic acid (IV).

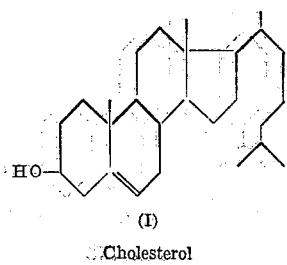

(I)
Cholesterol

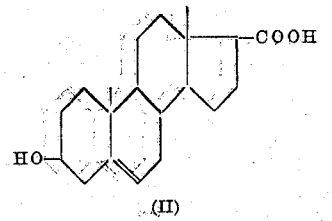

(II)
3-hydroxy-etio-cholenic-acid

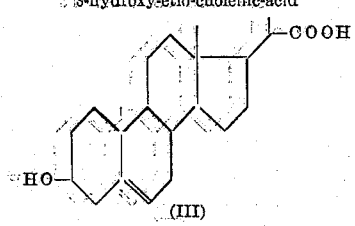

(III)
3-hydroxy-bis-nor-cholenic-acid

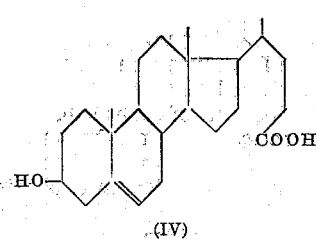

(IV)
3-hydroxy-cholenic acid

Suitable fractionation treatments are in particular the following: Fractional esterification, fractional saponification of esters, fractional crystallization, if required by way of suitable derivatives such as salts, esters, ethers, addition products with halogen or halogen hydride, and fractional vacuum distillation, if required in the form of derivatives. A particularly effective method has proved to be fractional saponification of the esters. The desired acids are thereby concentrated in the fractions which are less readily saponifiable and may be separated therefrom in pure form by one of the further methods above indicated. The fractionation treatments may, if desired, be repeated or used in combination.

The acids of the etio-cholanic series or derivatives thereof obtainable in accordance with the invention were hitherto accessible only with great difficulty and the invention provides an important improvement in their systematic production. The acids are of considerable technical importance, for example as intermediate products for the synthesis of compounds of the progesterone

Example 1

Cholesterol in the form of the acetate dibromide is oxidized in glacial acetic acid with chromic acid and after debromination the resulting admixture of oxidation products is separated into neutral and acid constituents by shaking the said crude admixture with caustic soda solution and ether, the acid constituents afterwards being liberated from the alkaline layer by acidulation and extracted with ether. 30 parts of the acid constituents obtained by evaporating the ethereal solution are completely esterified, for example with an ethereal solution of diazomethane. After removal of the ether by distillation, the residue is dissolved in 300 parts of methyl alcohol, 300 parts of a methyl alcoholic caustic potash solution of 10 per cent. strength are added and the mixture is heated to boiling in a reflux apparatus for 15 minutes. The methyl alcohol is evaporated under reduced pressure and the residue is separated, after dilution with water, into neutral and acid constituents by extracting the neutral constituents e. g. with ether, the acid constituents remaining in the alkaline watery solution, wherefrom they may be extracted, after acidulation, with e. g. ether. The neutral fraction amounting to about 10 parts is distilled under reduced pressure. Under a pressure of 0.02 millimeter and at a bath temperature which is raised gradually to 240° C. there are obtained 7–8 parts of distillate; the residue is rejected. The distillate is dissolved in twice its quantity of ether, petroleum ether is added until the solution becomes turbid and the solution is then inoculated with a trace of 3-hydroxy-etio-cholenic acid methyl ester and allowed to crystallize. The crystals which separate are filtered and washed with a mixture of 1 part of ether and 2 parts of petroleum ether. They constitute practically pure 3-hydroxy-etio-cholenic acid methyl ester which after one recrystallization from methyl alcohol is obtained completely pure. The product melts at 183–186° C. (corrected) after previous transformation into needles at about 170° C.

6 parts of the difficultly saponifiable methylester (obtained from the mother liquors of the crystals above described) are heated with 100 parts of a methyl alcoholic caustic potash solution of 10 per cent. strength in a reflux apparatus for 16 hours. The methyl alcohol is evaporated in vacuo and the residue after dilution with water, is freed from neutral constituents by shaking with ether. The alkaline layer is then acidified, whereby the acid constituents separate out and are then extracted with e. g. ether. The acids thus obtained (about 4 parts) are heated with three times their quantity of acetic anhydride for 20 minutes to boiling. The reaction liquid is then evaporated under reduced pressure and the residue is heated with three times the quantity of acetic acid of 90 per cent. strength for 3 hours at boiling temperature in order to decompose anhydrides. After evaporation under reduced pressure, the residue is dissolved in ether and the solution is extracted exhaustively with a strong solution of sodium carbonate. The sparingly soluble sodium salts which precipitate as an intermediate layer are filtered, washed with ether and sodium carbonate solution and then decomposed in the usual manner. The free acids so obtained are separated, either directly or after esterification, by fractional crystallization. In addition to a further quantity of 3-hydroxy-etio-cholenic acid there is obtained 3-hydroxy-bisnor-cholenic acid in pure form. It is also possible to proceed by deacetylating the above described sparingly soluble sodium salts of the acetylated acids by heating with alcoholic alkali and to precipitate first from the mixture the 3-hydroxy-bisnor-cholenic acid in the form of a salt.

Example 2

100 parts of the acid fraction obtainable by oxidation of sitosterol-acetate-dibromide are dissolved in six times the quantity of alcohol of high percentage strength containing 3 per cent. of hydrogen chloride and the whole is allowed to stand or is heated until about ⅔ of the total quantity of the acid fraction has become esterified. The bulk of the solvent is thereupon distilled and the residue is separated into neutral and acid constituents as described in Example 1. About 30 parts of a mixture of acids are obtained. They are dissolved in twice the quantity of acetone and the solution is allowed to crystallize, crystallization being completed by the addition of petroleum ether. The crystals constitute a mixture consisting essentially of hydroxy-bisnor-cholenic acid and hydroxy-etiocholenic acid. These acids are separated by fractional crystallization, if required in esterified form.

Example 3

Desoxycholic acid methylester diacetate is oxidized in glacial acetic acid with chromic acid, the glacial acetic acid is evaporated in vacuo and the residue, after dilution with water, is extracted with ether. The ethereal solution is shaken several times with sodium carbonate solution, the alkaline layers are acidified with hydrochloric acid and the thus liberated acidic oxidation products are extracted with ether. After the removal of ether 10 parts of the crude acids obtained are boiled with 5 parts of sodium hydroxide and 100 parts of water for three hours, whereby the two acetate groups are saponified. The reaction mixture is then acidified with hydrochloric acid and the liberated acids are extracted with ether. To the partly evaporated dried ethereal solution there is added an ethereal diazomethane solution obtained from 25 parts of nitroso-methyl urea. On evaporation of the ether an admixture of methyl esters is obtained. For partial saponification the latter is boiled in 70 parts of methyl alcoholic caustic potash solution of 5 per cent. strength for 15 minutes. This saponification leads to a neutral methyl ester fraction and an acid fraction which are separated in a manner analogous to that described in Example 1, the neutral fraction being afterwards saponified by means of methyl alcoholic caustic potash solution of 10 per cent. strength. By the latter procedure an acidic fraction is obtained which crystallizes in an admixture of acetone and ether. The crystals constitute practically pure 3,12-dihydroxy-etiocholanic acid, which may be characterized by its transformation into the corresponding methyl ester of melting point 106–107° C.

This application is a continuation-in-part of my application Serial No. 238,886, filed November 4, 1938, now abandoned.

What I claim is:

1. A process for the manufacture of saturated and unsaturated compounds of the etio-cholanic acid series, which comprises oxidizing a member of the group consisting of the saturated and unsaturated 10,13 - dimethyl - cyclopentanopolyhydrophenanthrenes containing a side chain in 17-position, a carbon atom of which is directly connected to the 17-carbon of the cyclopentanopolyhydrophenanthrene nucleus, and esters thereof, by the action of an oxidizing agent capable of splitting up single carbon to carbon bonds, to produce an admixture of oxidation products containing (a) acidic oxidation products which are more readily esterifiable than other acidic products of the admixture and whose esters are more easily saponified than the esters of said other products, (b) acidic oxidation products which are less readily esterifiable than said more readily esterifiable products and whose esters are less easily saponified than the esters of the latter, and (c) neutral products, separating all the acidic oxidation products from the neutral products by means of alkaline reagents, subjecting the mixture of the liberated free acids to complete esterification, selectively saponifying the relatively easily saponifiable esters and thereby producing a mixture of acidic constituents and neutral unsaponified ester constituents, separating the said acidic constituents from the neutral unsaponified ester constituents by means of alkaline reagents and isolating neutral esters of the said series by crystallization from these neutral constituents.

2. A process for the manufacture of saturated and unsaturated compounds of the etio-cholanic acid series, which comprises oxidizing a member of the group consisting of the saturated and unsaturated 10,13 - dimethyl - cyclopentanopolyhydrophenanthrenes containing a side chain in 17-position, a carbon atom of which is directly connected to the 17-carbon of the cyclopentanopolyhydrophenanthrene nucleus, and esters thereof, by the action of an oxidizing agent capable of splitting up single carbon-to-carbon bonds, to produce an admixture of oxidation products containing (a) acidic oxidation products which are more readily esterifiable than other acidic products of the admixture and whose esters are more easily saponified than the esters of said other products, (b) acidic oxidation products which are less readily esterifiable than said more readily esterifiable products and whose esters are less easily saponified than the esters of the latter, and (c) neutral products, separating all the acidic oxidation products from the neutral products by means of alkaline reagents, subjecting the mixture of the liberated free acids to complete esterification, selectively saponifying the relatively easily saponifiable esters and thereby producing a mixture of acidic constituents and neutral unsaponified ester constituents, separating the said acidic constituents from the neutral unsaponified ester constituents by means of alkaline reagents, then totally saponifying the last-named constituents and thereby producing a mixture consisting of acidic constituents, and finally isolating acids of the above-named series from these acidic constituents by precipitation thereof as sodium salts, decomposing the latter to liberate the free acids, and fractionally crystallizing the latter from the resultant reaction mass.

3. A process for the manufacture of saturated and unsaturated compounds of the etio-cholanic acid series, which comprises oxidizing a cholesterol ester, by the action of an oxidizing agent which splits up single carbon-to-carbon bonds, to produce a mixture of neutral and acidic oxidation products including 3-hydroxy-etio-cholenic acid and other acidic oxidation products which are more readily esterifiable than 3-hydroxy-etio-cholenic acid and whose esters are more readily saponified than the esters of 3-hydroxy-etio-cholenic acid, separating all the acidic oxidation products from the neutral products by means of alkaline reagents, subjecting the mixture of the liberated free acids to complete esterification, selectively saponifying the esters of said other acidic oxidation products while leaving the esters of 3-hydroxy-etio-cholenic acid unsaponified and thereby producing a mixture of acidic constituents and neutral unsaponified ester constituents, separating the said acidic constituents from the latter neutral constituents by means of alkaline reagents, and isolating the 3-hydroxy-etio-cholenic acid esters by crystallization from these neutral constituents.

4. A process for the manufacture of a 3-hydroxy-etio-cholenic acid ester, which comprises subjecting the mixture of acids, which is obtained by treating cholesterol in form of an ester dibromide with chromic acid, debrominating the resulting oxidation products and isolating the acid fraction by means of alkaline reagents, to complete esterification, selectively saponifying the relatively easily saponifiable esters in the resultant ester mixture and thereby producing a mixture of acidic constituents and neutral unsaponified ester constituents, separating the said acidic constituents from the said neutral constituents by means of alkaline reagents, and fractionally crystallizing an ester of the above-named series from the neutral unsaponified ester portion.

5. A process for the manufacture of 3-hydroxy-etio-cholenic methyl ester, which comprises subjecting the mixture of acids, which is obtained by treating cholesterol in the form of the acetate dibromide with chromic acid, debrominating the resulting oxidation products and isolating the acid fraction by means of alkaline reagents, to complete esterification with diazomethane, selectively saponifying the relatively easily saponifiable esters in the resultant ester mixture and thereby producing a mixture of acidic constituents and neutral unsaponified ester constituents including the methyl ester of 3-hydroxy-etio-cholenic acid, separating the said acidic constituents from the said neutral constituents by means of alkaline reagents, and fractionally crystallizing the said methyl ester from the neutral unsaponified ester portion.

TADEUS REICHSTEIN.